(12) United States Patent
Kern-Emmerich et al.

(10) Patent No.: US 8,746,748 B2
(45) Date of Patent: Jun. 10, 2014

(54) COUPLING SYSTEM, DISTRIBUTOR, PIPE SYSTEM, AND PIPE OFFSET SYSTEM

(75) Inventors: Thomas Kern-Emmerich, Niederwerrn (DE); Jorg Keller, Bielefeld (DE); Rudolf Geier, Sulzfeld (DE)

(73) Assignee: Uponor Innovation Ab, Fristad (SE)

( * ) Notice: Subject to any disclaimer, the term of this patent is extended or adjusted under 35 U.S.C. 154(b) by 0 days.

(21) Appl. No.: 13/505,524

(22) PCT Filed: Nov. 3, 2010

(86) PCT No.: PCT/EP2010/066749
§ 371 (c)(1),
(2), (4) Date: Jun. 11, 2012

(87) PCT Pub. No.: WO2011/054877
PCT Pub. Date: May 12, 2011

(65) Prior Publication Data
US 2012/0242079 A1   Sep. 27, 2012

(30) Foreign Application Priority Data
Nov. 5, 2009 (DE) .................... 20 2009 015 045 U

(51) Int. Cl.
*F16L 37/00* (2006.01)
(52) U.S. Cl.
USPC .......................................... 285/305; 285/321
(58) Field of Classification Search
USPC ................................................ 285/305, 321
See application file for complete search history.

(56) References Cited

U.S. PATENT DOCUMENTS

| | | | |
|---|---|---|---|
| 1,899,343 A | 2/1933 | Mackey et al. |
| 2,038,869 A | 4/1936 | Rader |
| 2,038,871 A | 4/1936 | Mueller et al. |
| 2,458,714 A | 1/1949 | Mahoney |
| 2,969,994 A | 1/1961 | Jacobs et al. |
| 3,127,199 A | 3/1964 | Homer |
| 3,239,244 A | 3/1966 | Leinfelt |

(Continued)

FOREIGN PATENT DOCUMENTS

| BE | 459616 | 8/1945 |
|---|---|---|
| DE | 4204430 | 2/1992 |

(Continued)

OTHER PUBLICATIONS

"Die flexible Verteilersysteme aus Kunststoff fur Sanitar and Heizung—SBK—Wasserverteiler 4001" Siegfried Bohnisch, Kunststofftechnik GmbH, p. 14, 05/1.004.

(Continued)

*Primary Examiner* — David E Bochna
(74) *Attorney, Agent, or Firm* — Occhiuti & Rohlicek LLP

(57) ABSTRACT

A coupling system includes two base bodies, each having an aperture for a fluid, an interior predefined circumferential depression and a locking surface. An adapter piece including an aperture for the fluid has two ends and at least two predefined circumferential depressions, which run at least partially along a circumference of the respective ends, wherein the first base body is associated with the first end of the adapter piece and the second base body is associated with the second end of the adapter piece, wherein in a state in which they are pushed inside each other the circumferential depression associated with the respective end of the adapter piece and the interior circumferential depression of the respective base body are located opposite of each other and form a receiving space. In addition, latching elements are provided to prevent the respective latching element from accidentally sliding out of the associated receiving space.

15 Claims, 4 Drawing Sheets

(56) References Cited

U.S. PATENT DOCUMENTS

| | | |
|---|---|---|
| 3,560,026 A | 2/1971 | Roe |
| 4,396,210 A | 8/1983 | Spencer, III et al. |
| 4,427,221 A | 1/1984 | Shay |
| 4,611,834 A | 9/1986 | Rabinovich |
| 4,749,192 A | 6/1988 | Howeth |
| 5,165,832 A | 11/1992 | Dimov |
| 5,490,694 A | 2/1996 | Shumway |
| 6,179,347 B1 | 1/2001 | Dole et al. |
| 6,325,424 B1 | 12/2001 | Metcalfe et al. |
| 6,343,813 B1 | 2/2002 | Olson et al. |
| 6,352,288 B1 | 3/2002 | Calkins |
| 6,739,629 B2 | 5/2004 | Riedy et al. |
| 7,481,464 B2 | 1/2009 | Fusser |
| 2003/0234536 A1 | 12/2003 | Riedy et al. |

FOREIGN PATENT DOCUMENTS

| | | |
|---|---|---|
| DE | 102004034686 | 1/2006 |
| DE | 102006026263 | 7/2007 |
| DE | 102008027382 | 12/2009 |
| EP | 0582354 | 2/1994 |
| WO | WO2006/007944 | 1/2006 |
| WO | WO2009/015927 | 2/2009 |
| WO | WO2009/150108 | 12/2009 |

OTHER PUBLICATIONS

"Fallrohrstutzenbefestigung fur SML-Fallrohrstutzen" product information, MEFA Befestigungs—and Montagesysteme GmbH.
"G3 Sanpress" product information www.viega.de (Jul. 3, 2008).
"iFIT-Baukastensystem" GF Piping Systems datasheet, Georg Fisher Rohrleitungssystememn AG, www.gf.com.

US 8,746,748 B2

COUPLING SYSTEM, DISTRIBUTOR, PIPE SYSTEM, AND PIPE OFFSET SYSTEM

CROSS-REFERENCE TO RELATED APPLICATIONS

This application is the National Stage of International Application No. PCT/EP2010/066749, filed on Nov. 3, 2010, which claims the priority of German Application No. 202009015045.3, filed on Nov. 5, 2009. The contents of both applications are hereby incorporated by reference in their entirety.

BACKGROUND

In pipeline construction, pipelines such as heating pipes are often coupled to each other by means of welding, soldering, and/or pressing. Various connecting elements are used, such as fittings or formed parts, that also allow hydraulic coupling of the pipelines to each other. The pipelines are thereby made, for example, of steel, copper, or plastic pipes.

DE 10 2008 027 382 describes a modular coupling system, for example, wherein base bodies are coupled by means of a press fitting. The press fitting is designed to be coupled directly to pipelines.

WO 2006/007944 AI shows a support body for hydraulically coupling two pipes to each other. The support body can thereby be coupled directly to only one pipe at the respective end thereof.

SUMMARY

The object of the invention is to provide a coupling system, a distributor, a pipe system, and a pipe offset system that can be used flexibly and that can be implemented as simply as possible.

The object is achieved by the features of the independent claims. Further embodiments of the invention are the objects of the dependent claims.

According to a first aspect, a coupling system comprises a first base body and a second base body. Both comprise a respective aperture for a fluid, and one respective interior prescribed circumferential recess, and one respective stop surface. The coupling system further comprises an adapter piece having a longitudinal axis and an axial aperture for the fluid, and having a first end and an opposite second end. The first end comprises at least one prescribed first circumferential recess extending at least partially along a circumference of the first end. The second end comprises at least one prescribed second circumferential recess extending at least partially along a circumference of the second end. The first base body is associated with the first end of the adapter piece and the second base body with the second end of the adapter piece. In a state wherein one is inserted into the other, the circumferential recess associated with the respective end of the adapter piece and the interior circumferential recess of the respective base body are opposite each other and form a receiving space. The coupling system further comprises at least two latching elements. One of the at least two latching elements can be inserted into the respective receiving space. The respective latching element comprises a stop element having an arresting catch. The stop element engages on the stop surface of the respective base body to prevent the respective latching element from accidentally sliding out of the associated receiving space.

Such a coupling system allows particularly flexible coupling of pipes by means of the base body and the adapter piece, wherein the adapter piece cannot be directly coupled to the pipes; rather, only the respective base body can be coupled directly to a pipe. The adapter pieces allows coupling to the respective base body and uncoupling in a non-destructive manner. The adapter piece can comprise only the first and second ends, for example, and is implement in said form for hydraulically coupling two pipes, such as plastic pipes, to each other by means of the associated base body. The modular coupling system has the advantage that base bodies that are implemented as distributor bodies or pipe connection bodies, for example, can be coupled to each other particularly easily.

If the adapter piece comprises a prescribed length, for example, such as 170 mm for a nominal diameter of less than 90 mm or 250 mm for a nominal diameter of greater than or equal to 90 mm, then the base bodies can also be axially spaced a prescribed distance apart by means of the adapter piece.

In order to achieve a high pressure resistance, the adapter piece and/or the respective base body comprises a thickness of the respective wall of between 6 and 10 mm. This allows a pressure resistance of 10 bar, for example. The adapter piece and/or the associated base body, or at least the respective regions thereof coming into contact with the fluid, are made of a heat-resistant material, such as PPSU, finished or sheathed, and thus allow transport of a fluid heated to 110° C., for example. The material used is further also suitable for transporting drinking water without adding toxins. The adapter piece and/or the respective base body can be made of solid plastic, for example, or of a multilayer composite, wherein the adapter piece can also comprise metal, such as brass or aluminum, in this case.

The respective receiving space can be (partially) annular in shape. The greater a circumferential angle the receiving space covers along the circumference of the respective end, the more tilting motions occurring between the adapter piece and the respective base body can be reduced. The receiving space can, for example, extend along a circumferential angle of greater than 180°, particularly up to 300°. Even helical extents of the respective receiving space are possible, in which the respective receiving space can extend over a circumferential angle of greater than 360°.

The latching element comprises the stop element at the opposite ends thereof, engaging particularly with the stop surface implemented on the base body, which takes place by means of a barb or another engagement of both elements, for example. The latching element can thereby be prevented from sliding out of the receiving space and from moving relative to the receiving space.

The stop element can also be used for handling the latching element when sliding into the receiving space. This be implemented either direction by manually exerting force, for example by hand, on the stop element. It is alternatively or additional possible that a tool is used. It is further advantageous if the stop element also comprises a handling element, particularly an opening, a recess, or a raised area for engaging a pulling tool by means of which the latching element can be pulled back out of the receiving space if necessary.

The respective latching element is typically guided in the respective receiving space by contact with the boundary surface thereof. The latching element can thus no longer shift sideways under thrust forces if it is located in at least the access space, and can then be fed further into the fitting, until it extends at least past the receiving space and thus can take on the latching function thereof. The respective latching element can thereby approximately completely fill a cross section of the associated receiving space, for example.

In order to achieve a limit to the insertion of one into the other, and thus to arrange the respective circumferential recess of the adapter piece and the associated interior circumferential recess, the adapter piece can comprise at least one partially annular intermediate element acting on the respective base body, for example, when it is placed far enough over the respective end of the adapter piece. The at least one intermediate element of the adapter piece thereby comprises a prescribed axial distance from the circumferential recess disposed at the associated end.

In one embodiment of the first aspect, the adapter piece comprises an attachment region having a disc-shaped first rim and a disc-shaped second rim. The first rim and the second rim extend at least partially along the circumference of the adapter piece between the first and second ends. The first rim comprises a prescribed axial distance from the second rim and a prescribed axial distance to the first circumferential recess. The second rim comprises a prescribed axial distance to the second circumferential recess. The attachment region serves to mount a fixing collar on the adapter piece, such that axial shifting of the adapter piece can be prevented by the two rims. The coupling system can thereby be attached easily and reliably, for example on a wall. The attachment region can also be implemented as a narrowing of the adapter piece. In this case, for example, a middle region of the attachment region can comprise a smaller diameter than, for example, a diameter of the first and/or second end of the adapter piece. The at least one intermediate element can thereby also be disposed between the first and second circumferential recess and the first and second rim.

In a further embodiment of the first aspect, the first and/or the second circumferential recess of the adapter piece each extend along a circumferential angle of about 270°. This allows particularly reliable coupling of the respective base body to the adapter piece by the respective latching element.

In a further embodiment of the first aspect, the first end and/or the second end of the adapter piece and/or the first base body and/or second base body each comprise at least one sealing element. Said sealing element supports reliable hydraulic seal tightness between the respective base body and the adapter piece. This can prevent the fluid from exiting the region between the telescoped contact surfaces, and from entering the region of the receiving space. The at least one sealing element can be implement as an annular sealing element, for example, such as a sealing ring.

In a further embodiment of the first aspect, the first and second base bodies each comprise a first and a second access space. The respective access space extends between an outer surface of the respective base body and the respective receiving space. The first access space is associated with one end of the respective receiving space and the second access space with an opposite end of the respective receiving space. This allows simple insertion of the respective latching element, either through the first access space or through the second access space, into the associated receiving space. The respective access space thereby opens substantially continuously, that is, substantially without protrusions, into the receiving space. The respective access space can open tangentially into the associated receiving space. The respective access space can be implemented as a hole.

In a further embodiment of the first aspect, the respective latching element comprises plastic and/or metal and/or is implemented as a cord, flexible shaft, chain, or strand. A flexible, substantially incompressible latching element can thereby be implemented, allowing reliable and releasable coupling.

In a further embodiment of the first aspect, the receiving space extends over a circumferential angle of about 270°. The first and second access space end at the exterior of the respective base body in two outer surfaces disposed approximately at right angles to each other, of which one is the stop surface. When the latching element is completely inserted in the access spaces and the receiving space, the stop element is located between the two outer surfaces, whereby the stop element interacts with the edge of the opening of the one of the two access spaces for stopping, in which the end of the latching element facing away from the stop element is present.

According to a second aspect, a distributor comprises at least one coupling system according to the first aspect. The first and second base bodies are thereby each implemented as a fluid distributing body. The distributor can thereby be implemented particularly easily. One or more fluid distributor bodies can further be simply added to the distributor or removed from the same. The coupling system thereby allows flexible use.

According to a third aspect, a piping system comprises at least one coupling system according to the first aspect. The first and second base bodies are thereby hydraulically coupled to one respective prescribed pipe. The pipe system can thereby be fixed by means of a fixing collar. The fixing collar engages in the attachment region of the respective adapter piece. Axial shifting of the pipe can thereby be prevented in the attached state. If the pipe system is attached vertically, for example, such as a string line system, then the fixing collar active at the respective attachment region can at least partially reliably bear the weight of the pipe system.

In one embodiment of the third aspect, the first and/or second base body is implemented as an angle piece. This allows a prescribed movement of the pipes in different pipe installation planes in an easy and flexible manner.

According to a fourth aspect, a piping system comprises at least one coupling system according to the first aspect. The first and second base bodies are thereby each implemented as 45° angle bodies. The first base body is associated with a first pipe installation plane and the second base body is associated with a second pipe installation plane. The adapter piece comprises a prescribed length. A prescribed movement of the pipe installation plane can thereby be implemented simply and quickly.

Embodiment examples of the invention are explained in greater detail below, using the schematic drawings. They show:

DETAILED DESCRIPTION

Figure 1:
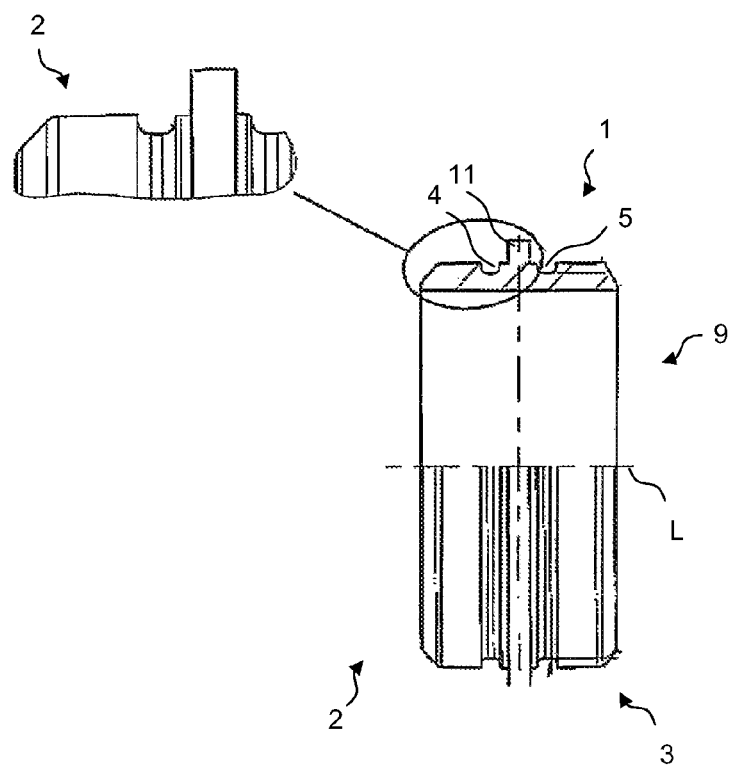
FIGS. 1, 2 Adapter pieces of different lengths,
FIGS. 3, 4 Latching mechanism of a coupling system,
FIG. 5 Distributor,
FIG. 6 Pipe system,
FIG. 7 Pipe offset system.

Elements having the same design or function are assigned the same reference numeral in all figures.

Figure 2:
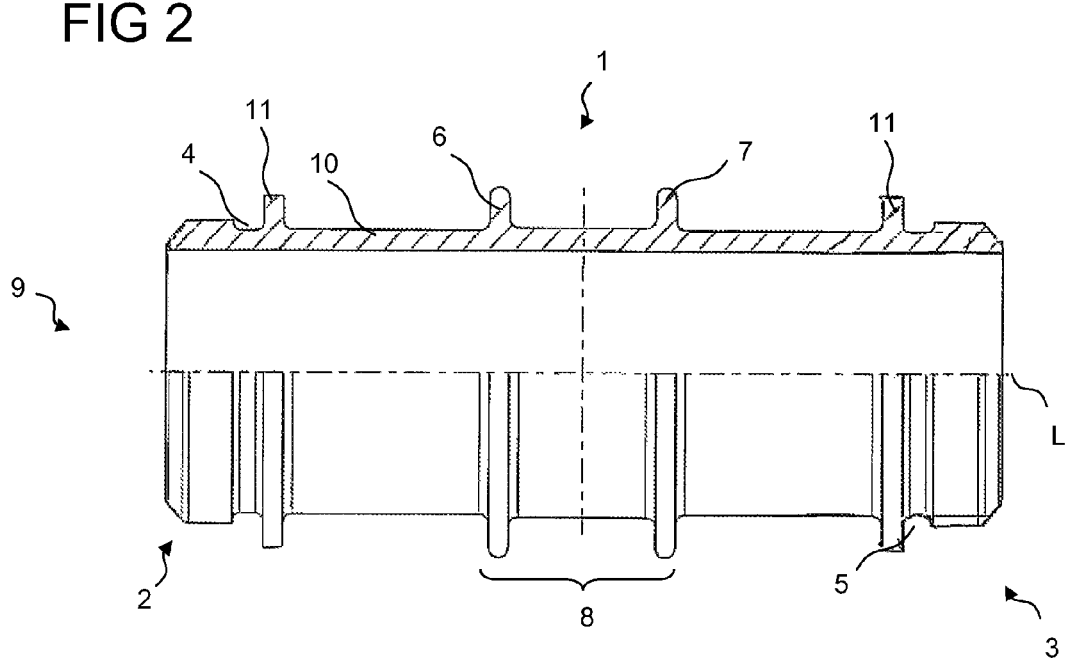

FIGS. 1 and 2 each show an adapter piece 1 having different lengths. The adapter piece 1 comprises a longitudinal axis L and an axial aperture 9 for a fluid, such as water. The adapter piece 1 can be made of plastic and/or metal, such as brass or aluminum, and can comprise a diameter between 63 and 110 mm, for example. A length of the adapter piece 1 can be approx. 170 mm for diameters less than 90 mm, for example, and approx. 250 mm for diameters greater than or equal to 90 mm. Fundamentally, lengths of less than 170 mm, such as 45 mm, are also possible. The adapter piece 1 comprises a first end 2 and an opposite second end 3. The first end 2 can comprise at least one first circumferential recess 4 and the second end 3 at least one second circumferential recess 5. The respective circumferential recess 4, 5 can extend at least partially annularly about a circumference of the respective end 2, 3 and comprises a prescribed shape, such as a depth between 3 and 5 mm. At least one disc-shaped intermediate element 11 can be provided between the first and second circumferential recess 4, 5, comprising a prescribed axial distance, such as 1.8 mm, from the respective circumferential recess 4, 5. An axial extent of the at least one intermediate element 11 can be 4 mm, for example. FIG. 2 shows two intermediate elements 11, for example.

The adapter piece 1 can further comprise an attachment region 8 having a disc-shaped first rim 6 and a disc-shaped second rim 7 (FIG. 2). The first rim 6 and the second rim 7 extend at least partially annularly along the circumference of the adapter piece 1 between the first and second ends 2, 3. The first rim 6 comprises a prescribed axial distance from the second rim 7 and a prescribed axial distance from the first circumferential recess 4. The second rim 7 comprises a prescribed axial distance from the second circumferential recess 5. For a correspondingly long adapter piece 1, the first and second rim 6, 7 can also be disposed axially spaced apart between two intermediate elements 11 (FIG. 2). In order to achieve a high pressure resistance, the adapter piece 1 and/or the respective base body 21 comprises a thickness of the respective wall 10 of between 6 and 10 mm. This allows a pressure resistance of up to 10 bar, for example. The adapter piece 1 and/or the associated base body 21, or at least the respective regions thereof coming into contact with the fluid, are made of a heat-resistant material, such as PPSU, finished or sheathed, and thus allow transport of a fluid heated to 110° C., for example. The material used is further also suitable for transporting drinking water.

Figure 3:
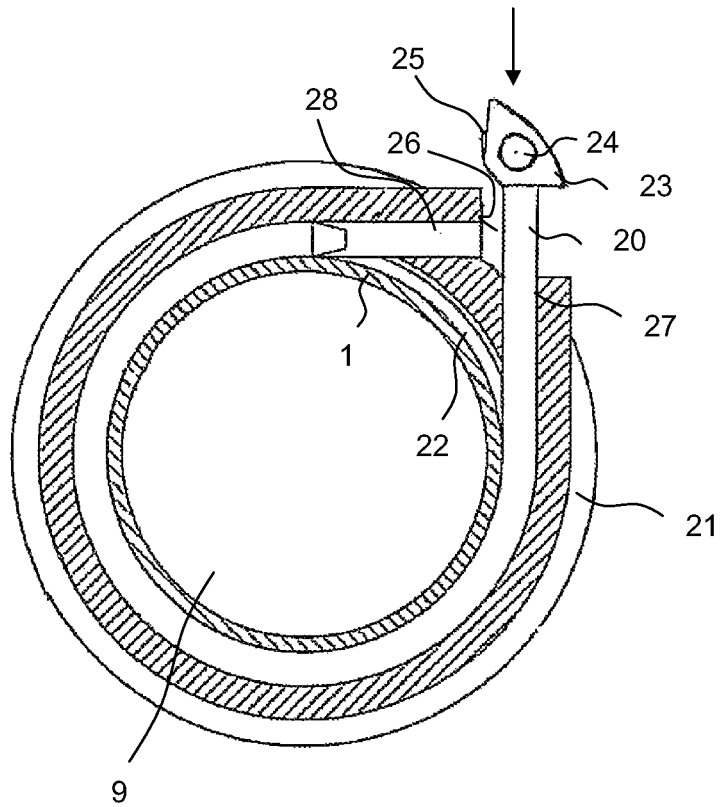
Figure 4:
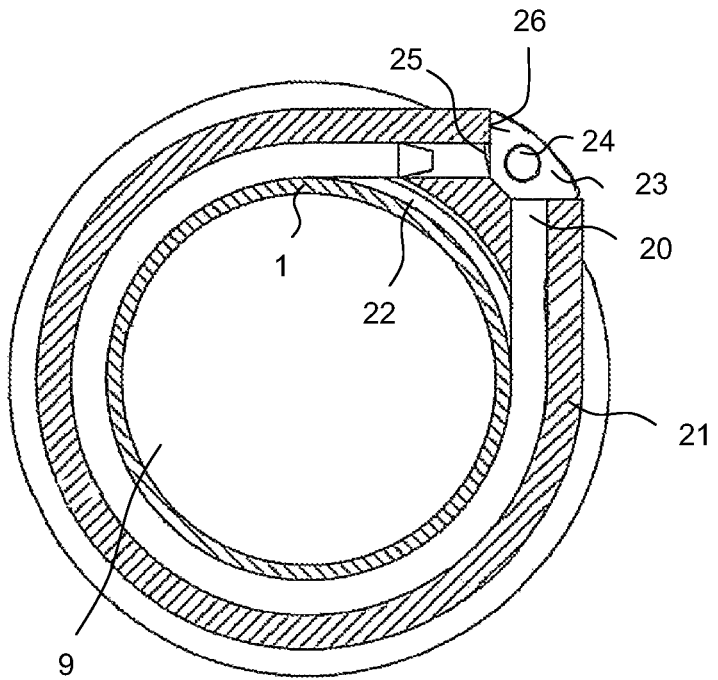

A latching mechanism is shown in cross section in FIGS. 3 and 4. A base body 21 is shown in cross section, enclosing one end of the first and second ends 2, 3 of the adapter piece 1. The base body 21 comprises an interior circumferential recess.

The base body 21 and the adapter piece 1 comprise contact surfaces that can be inserted one into the other, which are implemented as cylinders, for example. The contact surface of the base body 21 is formed by a part of the inner side of the wall of the base body 21, while the contact surface of the adapter piece 1 is formed by a part of the outer surface of the adapter piece 1.

In a state wherein the adapter piece 1 is inserted into base body 21, the interior circumferential recess of the respective base body and the associated circumferential recess 4, 5 of the adapter piece 1 are approximately opposite each other and form a receiving space 22. The receiving space 22 can extend over a circumferential angle of 270°. The base body 21 and the adapter piece 1 can be mechanically coupled to each other by a latching element 20. Depending on the retaining forces required, it may be necessary to provide a plurality of flexible, substantially incompressible and strand-shaped locking elements 20, wherein a plurality of receiving chambers 22 are then also present. The a plurality of receiving chambers 22 can extend at different circumferential angle ranges, so that locking by a plurality of locking elements 20 is provided across the entire circumference.

The base body 21 has a protrusion on the respective outer surface thereof, extending tangential to the receiving space 22. One access space 27, 28 each extends through the respective protrusion. The access chambers 27, 28 end in the (end) surfaces, extending at an acute or obtuse angle, or, as in the present embodiment example, at right angles to each other and at only a small distance from each other. The latching element 20 comprises a curved front end having a tip in the shape of a truncated cone, and has a stop element 23 at the end opposite the tip. The latching element 20 can be implemented as a single piece, for example.

The curved end of the latching element 20 is inserted into the access space 27, for example (FIG. 3). When the locking element 20 is inserted into the access chamber 27 and the receiving chamber 22, manual pressure can be applied to the wider end of the latching element 20 comprising the stop element 23. When the locking element 20 is nearly completely inserted in this manner, the result is the situation according to FIG. 4. Here the stop element 23 engages with an arresting catch 25 in an access opening of the surface, which can also be referred to as the stop surface 26, of the protrusion. The stop element 23 then fills the free space between the two (end) surfaces and thereby contacts the outer surface of the base body 21. The arresting catch 25 prevents the stop element 23 from releasing and thus the latching element 20 from being able to slide out of the receiving space 22.

The mechanical coupling of the adapter piece 1 to the base body 21 is done by the at least one flexible, substantially incompressible strand-shaped latching element 20, when said element is present in the associated receiving space 22. It is thereby sufficient if the respective latching element 20 is located exclusively in said receiving chamber 22. Extension of the respective latching element 20 into one or even both of the access chambers 27, 28 is not necessary in order to implement the latching mechanism. In the coupled state, an axial displacement of the respective coupled base body relative to the adapter piece coupled thereto is substantially no longer possible.

As can be seen in the FIGS. 3 and 4, the stop element 23 can comprise an opening 24 or recess extending transverse to the extension of the latching element 20 that can be used for allowing thrust or tensile forces to act on the stop element 23. For example, a bar or the like can be inserted through the opening 24 and then serve as a handling aid and a handle, in order to slide the latching element 20 into the respective receiving space 22, or pull said element out of the respective receiving space, by exerting thrust or tensile forces.

At least one annular sealing element can be provided on the exterior about the respective end 2, 3 of the adapter piece 1, hydraulically sealing the opposing contact surfaces of the adapter piece 1 and the respective base body 21 against each other. The at least one sealing element can alternatively or additional also be disposed on an inner surface of the base body 21.

One respective base body is associated with each end 2, 3 of the adapter piece 1 and can be implemented differently. The adapter piece 1 is thus implemented simply for hydraulically coupling base bodies 1 to each other, allowing the latching mechanism described in FIGS. 3 and 4. The adapter piece 1 having the two respectively associated base bodies can be called a coupling system.

Figure 5:
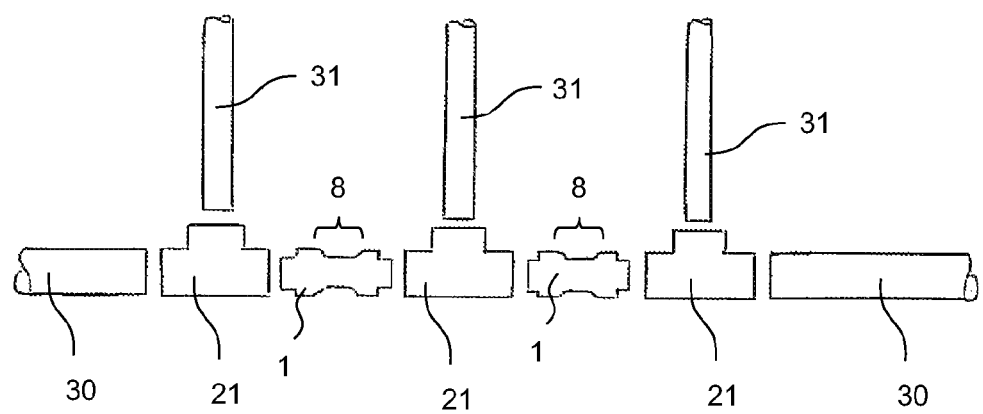

FIG. 5 shows a distributor comprising two coupling systems each having one adapter piece 1. The respective base body 21 is implemented as a fluid distributing body and comprises three connections, wherein more connections are also possible. Two base bodies 21 comprise two respective pipe connections and are thereby hydraulically connected to the pipes 30 and the branch pipes 31. Said two base bodies 21 further comprise a respective connection for the respective adapter piece 1.

A further base body 21 comprises a pipe connection allowing hydraulic coupling to the branch pipe 31. The further base body 21 further comprises two connection for one adapter piece 1 respectively. More or fewer coupling systems can also be used for the distributor. The adapter piece 1 thus allows simple and fast hydraulic coupling between the base bodies 21, and thus a flexible implementation of a distributor for distributing the fluid. The distributor can be mounted on a wall, for example, by means of the attachment regions. It is further possible that the respective base body 21 also comprises a valve in order to prescribe, for example, a discharge of a quantity of fluid into the branch pipes 31.

The pipes 30 and/or the branch pipes 31 can be coupled to the respective base body 21 by means of pressing, for example, wherein welding or soldering can also be used.

Figure 6:
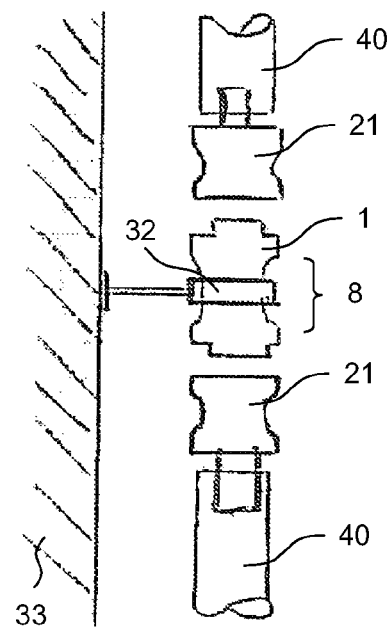

FIG. 6 shows a pipe system having a coupling system. The two base bodies 21 are respectively implemented as pipe connection bodies and respectively comprise a connection for the adapter piece 1 and a connection for a pipe 40, wherein here also the respective pipe 40 can be coupled to the respective base body 21 by means of pressing, wherein welding or soldering can also be used. The pipe system can comprise a plurality of coupling systems.

The pipe system is mounted on a wall 33 by means of one or more fixing collars 32. The respective fixing collar 32 thereby engages in the attachment region 8 of the respective adapter piece 1. The attachment region 8 is implemented in FIG. 6 as a narrowed region, for example, but can additionally or alternatively also comprise the first and second attachment rim 6, 7 (FIG. 2). It is also possible that only one rim is provided, which would be able to be applied above the fixing collar 32 in FIG. 6.

The attachment region 8 of the respective adapter piece 1 has the advantage that the pipe system is substantially not axially displaceable. If the pipe system is disposed vertically, as shown in FIG. 6, the attachment region 8 allows reliable attachment by means of the fixing collar 32, which can thereby receive at least one part of the weight of the pipe system.

The base bodies 21 can be respectively implemented as angle fittings, and as such can hydraulically couple the adapter piece 1 to the respective pipe 40.

Figure 7:
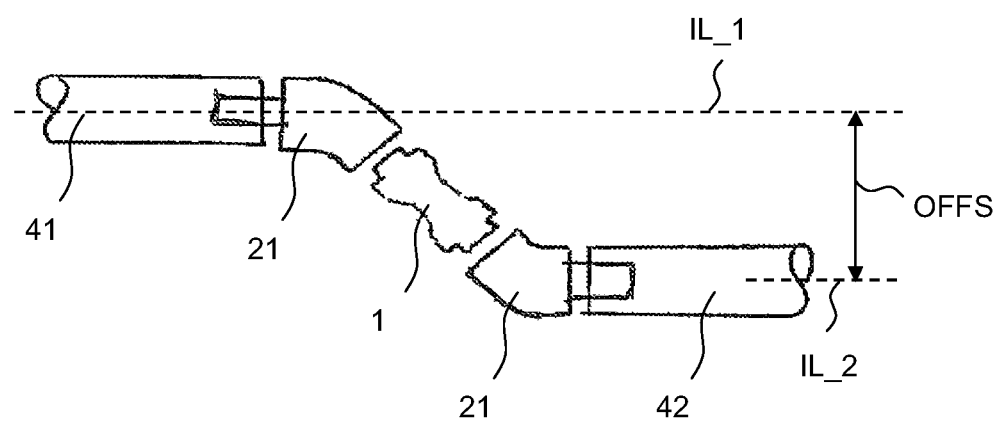

In a particular embodiment as a pipe offset system, the two base bodies 21 of the coupling system are implemented as 45° angle fittings. The pipe offset system is implemented for hydraulically coupling a first pipe 41 and a second pipe 42. Both base bodies 21 comprise one respective connection for the adapter piece 1 and one connection for the respective pipe 41, 42, wherein the respective pipe 41, 42 can be coupled here again to the respective base body 21 by means of pressing. The pipe offset system can comprise a plurality of coupling systems. The adapter piece 1 comprises a prescribed length, such as 170 mm or 250 mm, depending on the respective diameter. The adapter piece 1 having the associated 45° angle fittings allows a prescribed offset OFFS between a pipe installation plane IL1 associated with the first pipe 41, such as directly below a building ceiling, and a pipe installation plane IL2 associated with the second pipe 42, such as vertically spaced apart from the building ceiling. The pipes shown in FIGS. 5 through 7 can be made of plastic or multilayer composite pipes, for example. Metal pipes can also be used.

REFERENCE LIST

1 Adapter piece
2 First end
3 Second end
4 First circumferential recess
5 Second circumferential recess
6 First rim
7 Second rim
8 Attachment region
9 Aperture
10 Wall
11 Intermediate element
20 Latching element
21 Base body
22 Receiving space
23 Stop element
24 Opening
25 Arresting catch
26 Stop surface
27 First access space
28 Second access space
30, 31,
40, 41,
42 Pipe
32 Fixing collar
33 Wall
IL1 First pipe installation plane
IL2 Second pipe installation plane
OFFS Offset

The invention claimed is:

1. A coupling system comprising
a first base body comprising a first aperture for a fluid and a first interior circumferential recess,
a second base body comprising a second aperture for the fluid and a second interior circumferential recess,
an adapter piece having a third aperture for the fluid, and having a first end and an opposite second end, the first end being configured for insertion into the first base body and comprising at least one first end exterior circumferential recess running at least partially along a circumference of the first end, and the second end being configured for insertion into the second base body and comprising at least one second end exterior circumferential recess running at least partially along a circumference of the second end,
wherein, upon insertion of the first end of the adapter piece into the first base body, the first interior circumferential recess is aligned with the first end exterior circumferential recess thereby forming a first receiving space, and upon insertion of the second end of the adapter piece into the second base body, the second interior circumferential recess is aligned with the second end exterior circumferential recess thereby forming a second receiving space,
a plurality of latching elements including a first latching element configured for insertion into the first receiving space, the first latching element including a stop element having an arresting catch, said arresting catch configured to engage an inner surface of the first receiving space
wherein the first and second base body comprise at least one first and one second access space, wherein the respective access space extends between an outer surface of the respective base body and the receiving space, wherein the first access space is associated with one end of the respective receiving space and the second access space is associated with an opposite end of the respective receiving space.

2. The coupling system according to claim 1, wherein the aperture of the adapter piece comprises a diameter between 63 and 100 mm, and the length of the adapter piece is approx.

250 mm for diameters greater than or equal to 90 mm, and is in the range between 40 mm and 200 mm, preferably approx. 170 mm, for diameters less than 90 mm.

3. The coupling system according to claim 1, wherein a wall of the adapter piece comprises a thickness between 6 and 10 mm.

4. The coupling system according to claim 1, wherein the first and/or second circumferential recess of the adapter piece respectively extend along a circumferential angle of approx. 270°.

5. The coupling system according to claim 1, wherein the first end and/or second end of the adapter piece and/or the first base body and/or second base body respectively comprise at least one sealing element.

6. The coupling system according to claim 1, wherein the respective latching element comprises plastic and/or metal and/or is implemented as a cord, flexible shaft, chain, or strand.

7. The coupling system according to claim 1, wherein the receiving space extends over a circumferential angle of approx. 270°, and wherein the first and second access space end in two surfaces disposed at approximately right angles to each other on the outside of the respective base body.

8. A distributor comprising at least one coupling system according to claim 1, wherein the first and second base body are respectively implemented as a fluid distributing body.

9. A pipeline system comprising at least one coupling system according to one of claim 1, wherein the first and second base body are respectively hydraulically coupled to a prescribed pipe, and the pipeline system can be fixed by means of at least one fixing collar engaging with the mounting area of the adapter piece.

10. The pipeline system according to claim 9, wherein the first and/or second base body are respectively implemented as elbow fittings.

11. The coupling system of claim 1 wherein the arresting catch is configured to prevent unintended removal of the first latching element from the first receiving space.

12. A coupling system comprising
a first base body comprising a first aperture for a fluid and a first interior circumferential recess,
a second base body comprising a second aperture for the fluid and a second interior circumferential recess,
an adapter piece having a third aperture for the fluid, and having a first end and an opposite second end, the first end being configured for insertion into the first base body and comprising at least one first end exterior circumferential recess running at least partially along a circumference of the first end, and the second end being configured for insertion into the second base body and comprising at least one second end exterior circumferential recess running at least partially along a circumference of the second end,
wherein, upon insertion of the first end of the adapter piece into the first base body, the first interior circumferential recess is aligned with the first end exterior circumferential recess thereby forming a first receiving space, and upon insertion of the second end of the adapter piece into the second base body, the second interior circumferential recess is aligned with the second end exterior circumferential recess thereby forming a second receiving space,
a plurality of latching elements including a first latching element configured for insertion into the first receiving space, the first latching element including a stop element having an arresting catch, said arresting catch configured to engage an inner surface of the first receiving space,
wherein the adapter piece comprises an attachment region having a disc-shaped first rim and a disc-shaped second rim, wherein the first rim and second rim run at least partially along the circumference of the adapter piece between the first and second end, and the first rim comprises a prescribed axial spacing from the second rim and a prescribed axial spacing from the first circumferential recess, wherein the second rim comprises a prescribed axial spacing from the second circumferential recess.

13. The coupling system of claim 12 wherein the receiving space extends over a circumferential angle of approx. 270°, and wherein the first and second access space end in two surfaces disposed at approximately right angles to each other on the outside of the respective base body.

14. A pipe offset system comprising a coupling system including:
a first base body comprising a first aperture for a fluid and a first interior circumferential recess,
a second base body comprising a second aperture for the fluid and a second interior circumferential recess,
an adapter piece having a third aperture for the fluid, and having a first end and an opposite second end, the first end being configured for insertion into the first base body and comprising at least one first end exterior circumferential recess running at least partially along a circumference of the first end, and the second end being configured for insertion into the second base body and comprising at least one second end exterior circumferential recess running at least partially along a circumference of the second end,
wherein, upon insertion of the first end of the adapter piece into the first base body, the first interior circumferential recess is aligned with the first end exterior circumferential recess thereby forming a first receiving space, and upon insertion of the second end of the adapter piece into the second base body, the second interior circumferential recess is aligned with the second end exterior circumferential recess thereby forming a second receiving space,
a plurality of latching elements including a first latching element configured for insertion into the first receiving space, the first latching element including a stop element having an arresting catch, said arresting catch configured to engage an inner surface of the first receiving space,
wherein the first and second base body comprise at least one first and one second access space, wherein the respective access space extends between an outer surface of the respective base body and the receiving space, wherein the first access space is associated with one end of the respective receiving space and the second access space is associated with an opposite end of the respective receiving space,
wherein the aperture of the adapter piece comprises a diameter between 63 and 100 mm, and a length of the adapter piece is approx. 250 mm for diameters greater than or equal to 90 mm, and is in the range between 40 mm and 200 mm, preferably approx. 170 mm, for diameters less than 90 mm and the first base body and the second base body are respectively implemented as 45° angle fittings, the first base body being associated with a first pipe installation plane (IL1), and the second base body being associated with a second pipe installation plane (IL2).

15. The pipe offset system of claim 14 wherein the receiving space extends over a circumferential angle of approx. 270°, and wherein the first and second access space end in two surfaces disposed at approximately right angles to each other on the outside of the respective base body.

* * * * *